Sept. 12, 1933.　　　J. C. BONNER　　　1,926,427
FREIGHT TRANSPORTATION
Filed May 23, 1930　　　5 Sheets-Sheet 1
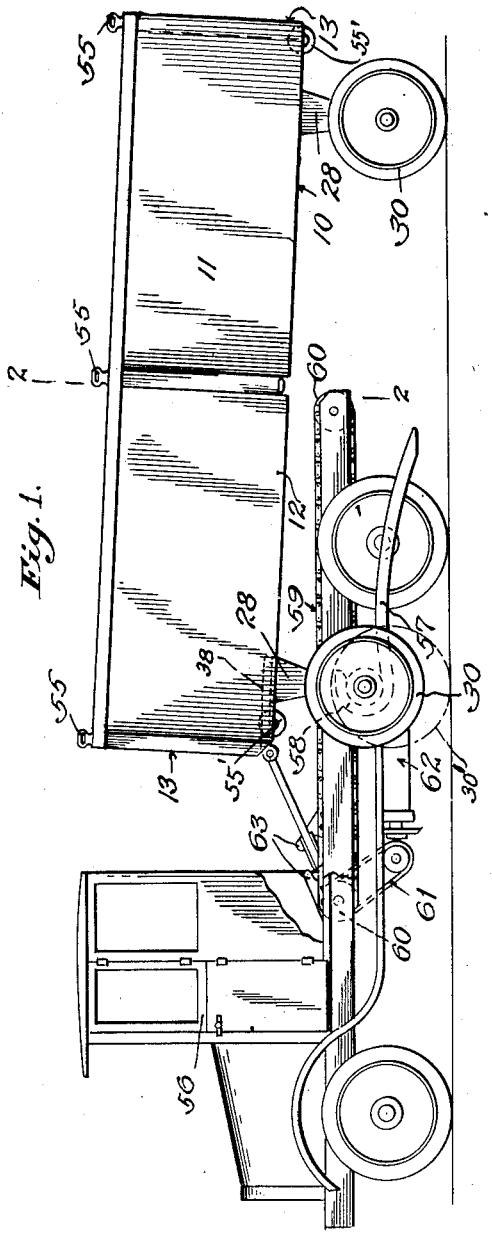
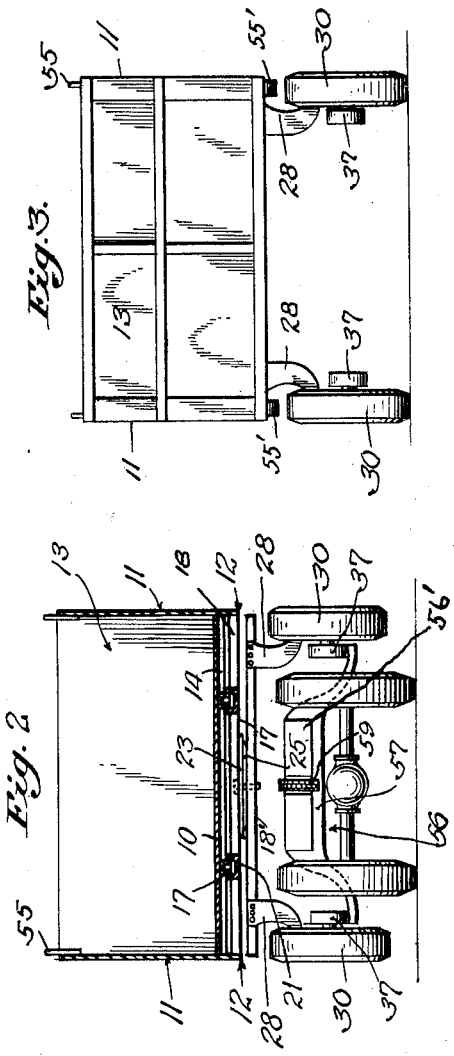
Inventor,
Joseph C. Bonner
By K. P. McElroy
his Attorney.

Sept. 12, 1933.  J. C. BONNER  1,926,427
FREIGHT TRANSPORTATION
Filed May 23, 1930  5 Sheets-Sheet 2
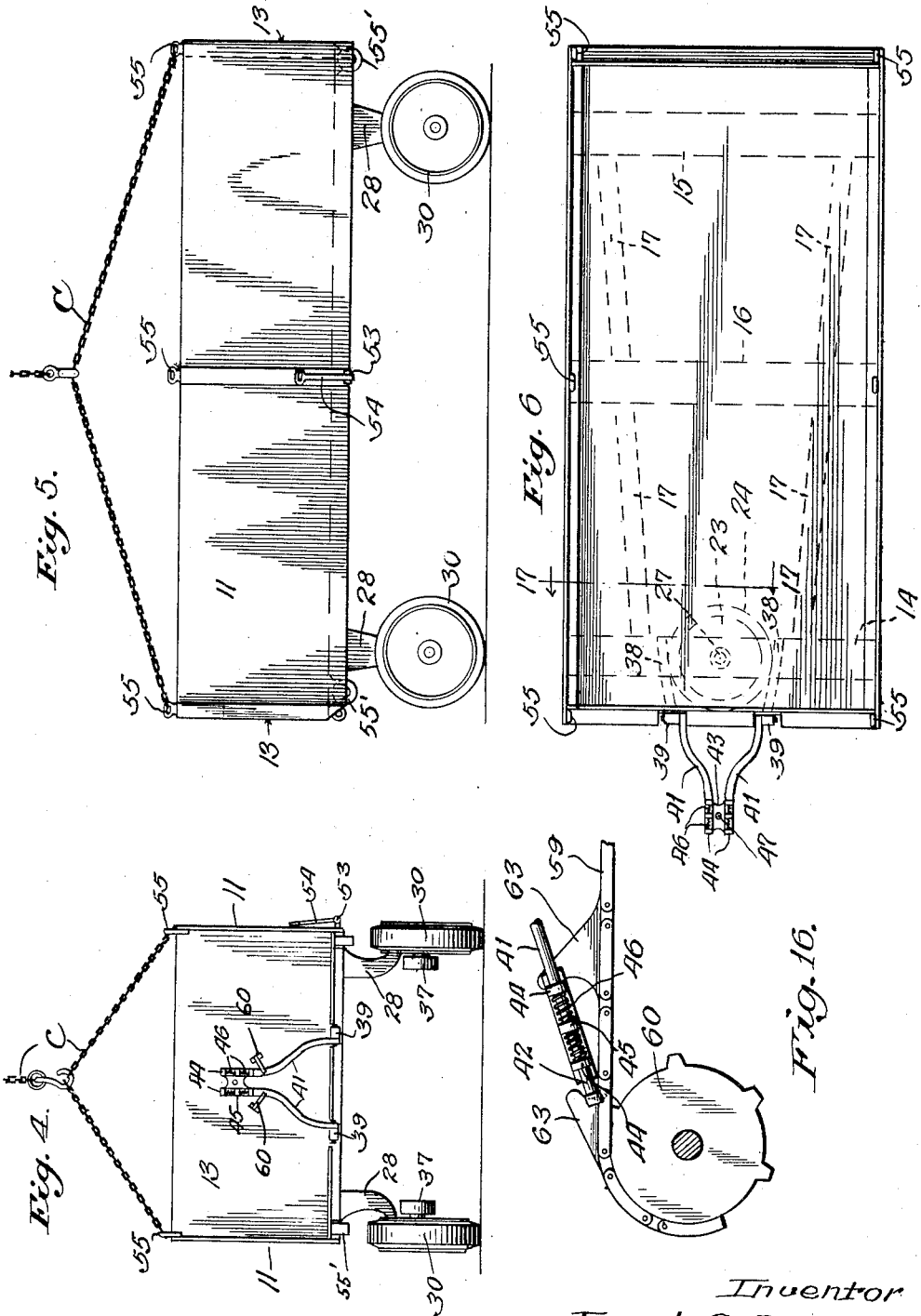
Inventor
Joseph C. Bonner.
By H. A. McElroy
his Attorney.

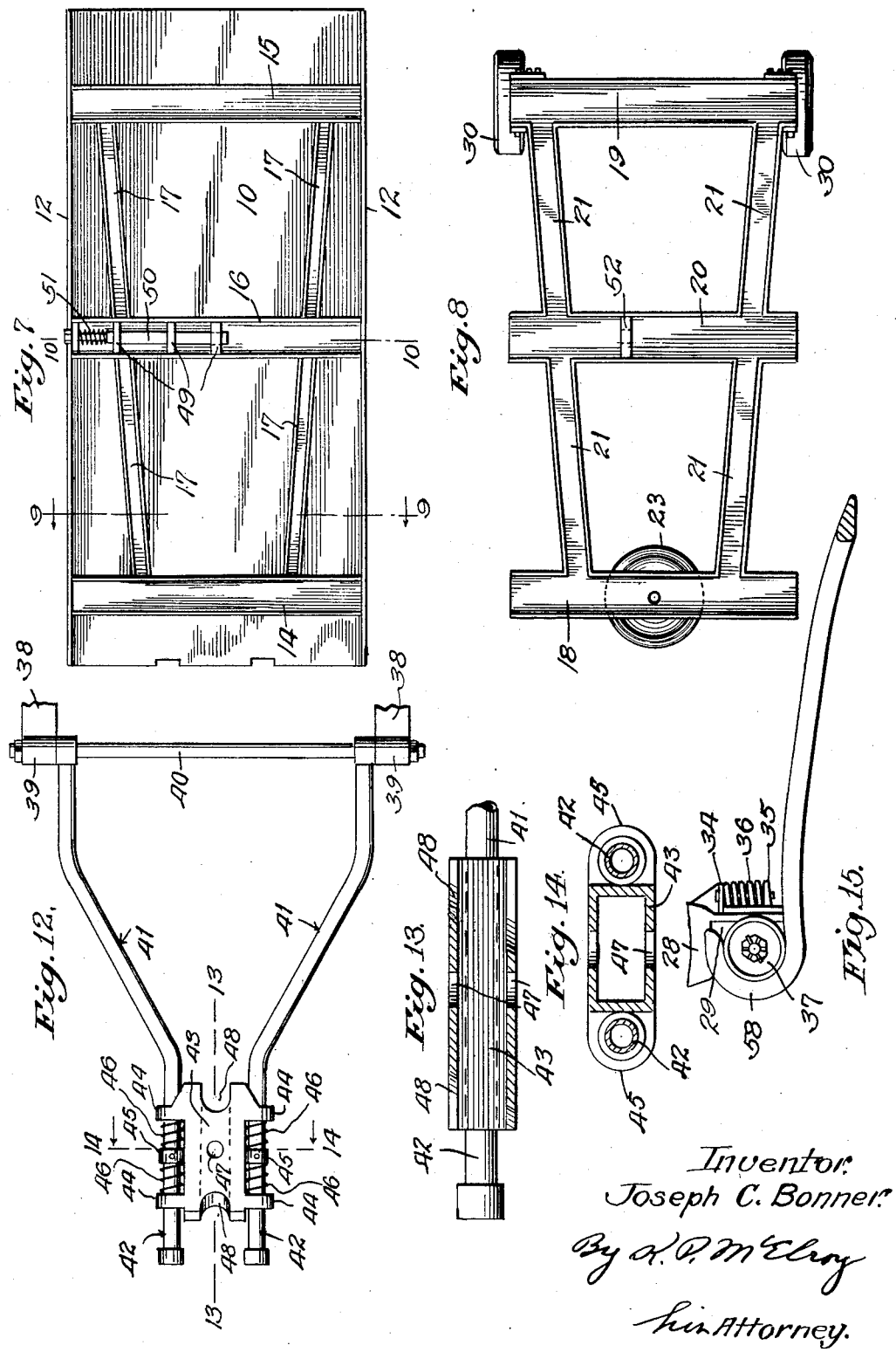

Inventor
Joseph C. Bonner.
By L. P. McCoy
his Attorney.

Sept. 12, 1933.　　　J. C. BONNER　　　1,926,427
FREIGHT TRANSPORTATION
Filed May 23, 1930　　　5 Sheets-Sheet 5
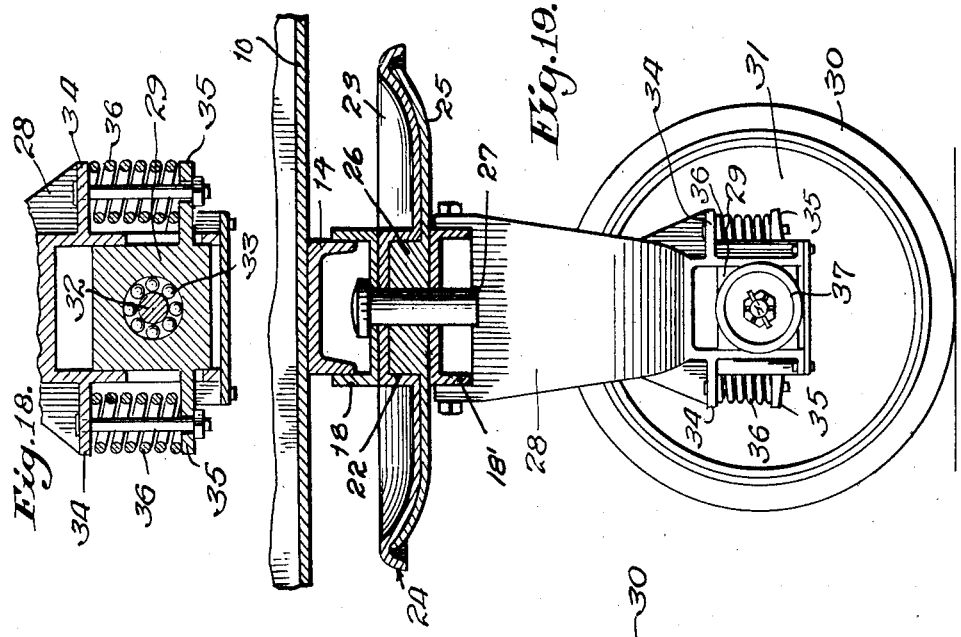
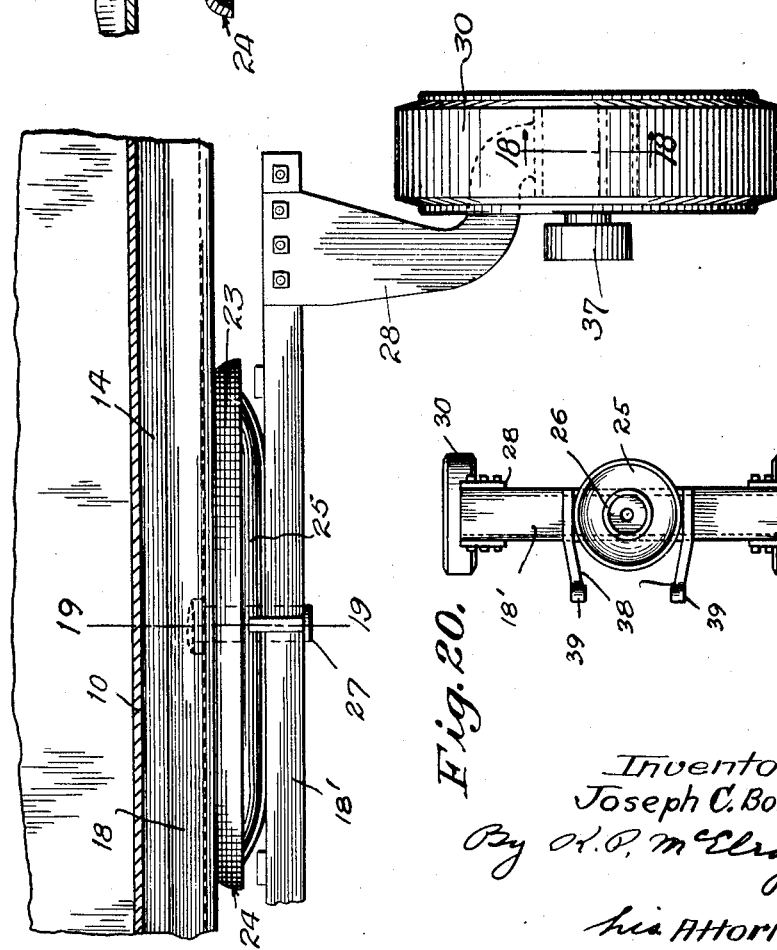
Inventor:
Joseph C. Bonner
By O. P. McElroy
his Attorney.

Patented Sept. 12, 1933

1,926,427

UNITED STATES PATENT OFFICE 1,926,427

FREIGHT TRANSPORTATION

Joseph Claybaugh Bonner, Toledo, Ohio

Application May 23, 1930. Serial No. 455,028

9 Claims. (Cl. 280—33.1)

This invention relates to freight transportation and more particularly to a convertible vehicle for such transportation.

Under the present development of freight transportation, much of the transported tonnage, especially on relatively short hauls, is effected in road vehicles designed to operate or travel on the ordinary highways, streets, and roads formed throughout the world. Long hauls are, however, more economically effected on railroads or by water.

The present invention provides an improved construction of a convertible road vehicle having a removable body which can, as a unit, be detached from the running gear or chassis of the vehicle, and stored in a warehouse, loaded onto a railroad car of the flat or gondola type or loaded upon a freight carrying ship or vessel, without disturbing the load in said vehicle body.

The present invention further provides means, as a permanent part of a convertible road vehicle, for enabling the body of the vehicle, to be readily moved into any desired position for transportation before and after it has been deposited on the railroad car or vessel.

The invention also provides, in a vehicle of the class set forth, improved means for connecting the vehicle or the vehicle chassis to a truck or the like for hauling the vehicle or the vehicle chassis, such means being arranged to cushion the vehicle units against the shocks incident to the starting and stopping of the truck or the like, the shocks of coupling the one to the other, and such other shocks as may occur in hauling.

Novel and improved means are provided for securing the body of the vehicle of the class set forth, to what may be termed its road chassis or running gear.

Vehicles for transporting freight along roads are usually supported on four wheels and are often drawn by a team of horses or a separate tractor, such vehicles being motorless. Under certain conditions it is desirable that the load be carried on all four wheels while under other conditions it is desirable that the front of the vehicle be raised from the ground, the forward end being supported on the rear portion of the tractor, the vehicle traveling either on its two rear wheels or on all four of its wheels. In loading to such controlled carried conditions much difficulty is experienced in positioning the forward end of the freight carrying vehicle on such a tractor, and in the usual manner of accomplishing this result the front wheels of the vehicle have to be substituted by a pair of lift stilts to which are appended small roller wheels, the front or forward end of the vehicle being thus raised by the jacks or the like.

To this end, the present invention provides a vehicle of the class set forth with improved and novel draft means for connecting the said vehicle to a tractor, such draft means being also adapted to secure the front of the vehicle in raised or in the usual road treading positions on a tractor without in any way interfering or disturbing the front wheel assembly of the vehicle.

The invention further provides an improved tractor used in combination with the improved vehicle for loading, locking and resiliently engaging the vehicle while supporting the front end thereof and so to distribute the bearing weight equally to all the wheels of both vehicles and so minimize the strain and wear of the highway. Further objects of the invention will be hereinafter more fully set forth.

I have illustrated in the accompanying drawings one novel form of improved combination vehicle and tractor of the class set forth which will be described in detail to enable others to understand and use the same. However, the invention is not considered restricted to the specific construction shown in the drawings as various changes and modifications may be made therein without departing from the spirit and scope of my invention as defined in the appended claims.

In the drawings:

Figure 1 is a view in side elevation illustrating the improved vehicle in combination with a special tractor therefor.

Figure 2 is a vertical sectional view taken on the line 2—2 of Figure 1.

Figure 3 is a view in rear elevation of the novel improved vehicle.

Figure 4 is a view in front elevation of the vehicle illustrating crane chains attached thereto to lift the body off the chassis.

Figure 5 is a view in side elevation of the vehicle illustrating crane chains attached thereto to lift the body off the chassis.

Figure 6 is a plan view of the improved vehicle.

Figure 7 is a bottom plan view of the vehicle body detached from the chassis.

Figure 8 is a plan view of the vehicle chassis, the body having been removed.

Figure 12 is an enlarged detail plan view of the novel draw-bar or hitch-hound used in this invention.

Figure 13 is an enlarged detail sectional view taken on the line 13—13 of Figure 12.

Figure 14 is a similarly enlarged detail sectional view taken on the line 14—14 of Figure 12.

Figure 15 is an enlarged detail view in side elevation illustrating the rails and supplemental wheels for lifting the front end of the vehicle.

Figure 16 is an enlarged detail view illustrating a portion of the draw-bar and the means for drawing the front end of the vehicle up on the tractor.

Figure 17 is an enlarged detail sectional view taken on the line 17—17 of Figure 6, illustrating the fifth wheel.

Figure 18 is a detail sectional view taken on the line 18—18 of Figure 17.

Figure 19 is a detail sectional view taken on the line 19—19 of Figure 17.

Figure 20 is a plan view of the front truck member.

Figure 9:
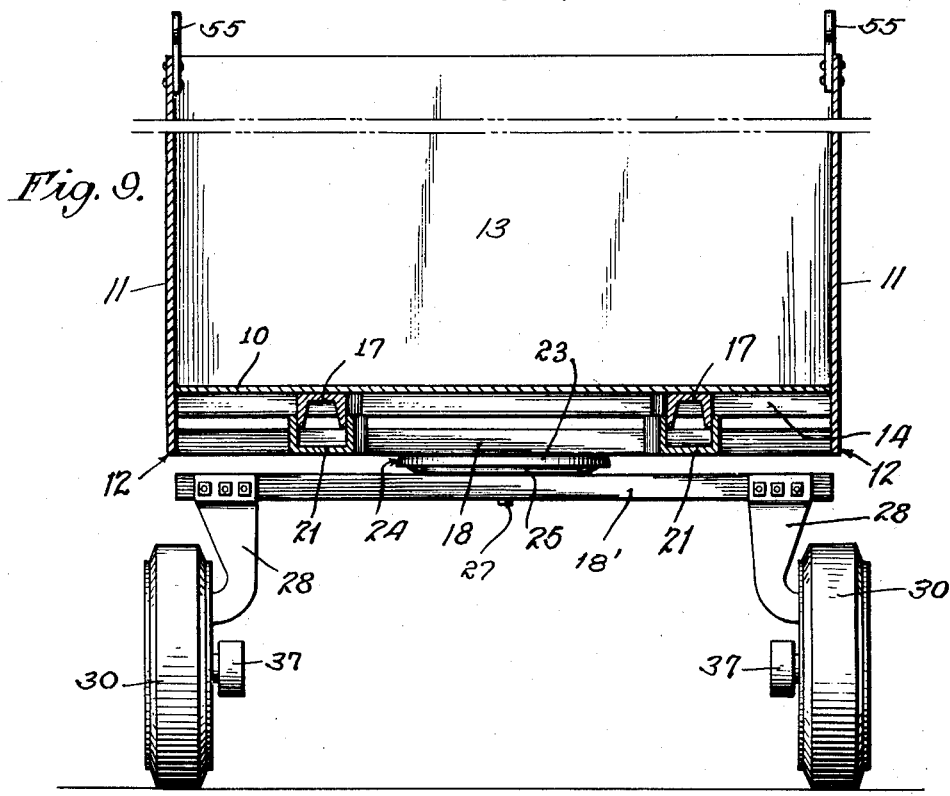
Figure 9 is an enlarged transverse sectional view taken on the line 9—9 of Figure 7.

In the embodiment of the invention here illustrated there is provided a vehicle body having a floor or bottom 10 of rectangular form. Side walls 11 are suitably connected to bottom 10 and extend below the same to constitute side sills 12 depending from the body. The ends of the body are closed by end walls 13, thus providing a box-like structure. As more particularly illustrated in Figure 7, a front body bolster 14, a rear body bolster 15 and a central body cross frame or sill 16 are secured beneath the floor 10 in any desired manner and extend transversely of the vehicle from one flange 12 to the other.

These transverse bolsters 14 and 15, and cross frame 16 are preferably formed of channel iron and are positioned flat-wise with their webs against the bottom 10 and their flanges projecting downwardly as shown. Extending between the bolster 14 and cross frame 16 and also between the latter and bolster 15 are longitudinal channel iron members 17 similarly disposed with their webs horizontal and against the bottom 10 and their flanges depending downwardly.

As best illustrated in Figure 8, the chassis comprises a frame formed of channel iron and including a front transverse chassis bolster 18, a rear transverse chassis bolster 19 and a central transverse chassis frame member or sill 20 connected by longitudinal channel members 21. The transverse and longitudinal members of this frame are positioned in opposition to the bolsters 14 and 15, cross frame 16, and the channel irons 17 of the vehicle body, and in like manner have their webs horizontal.

Figure 11:
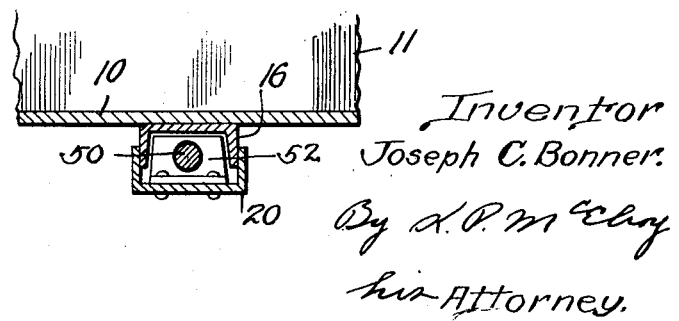
Figure 11 is a detail sectional view taken on the line 11—11 of Figure 10.

The flanges of these chassis members, however, extend upwardly and the channel irons are of proper width to snugly receive the corresponding flanges of the channel members on the body so that, when the body is positioned upon the chassis, these parts interlock as more particularly illustrated in Figures 9 and 11 of the drawings.

It will be readily understood that by the construction just described the body is held against longitudinal and lateral displacement on the chassis, the longitudinal channels and the front and rear bolsters thus interlocking. A front truck bolster member 18', (see Figure 20 of the drawings), is provided, preferably formed of channel iron and of substantially the same length as the front chassis bolster 18 and adapted to be positioned therebeneath, for a purpose to be hereinafter more fully described.

As further seen in the drawings, there is secured beneath the center of the front chassis bolster 18 a shallow dish-shaped fifth wheel body member 23 provided with a down-turned rim portion 24. Similarly there is fixed centrally to the truck bolster 18' a coacting shallow dish-shaped fifth wheel truck member 25, the rim 24 overhanging the periphery of the said member 25 and being complementary thereto. A suitable central hub-like portion 26 on the member 25 coacting with a circular flange 22 on the member 23 keeps these parts in proper positions and a king pin 27, suitably spaced to allow sufficient play, connects the two complemental fifth wheel members so that they may revolve and/or dip one on the other, and the bolster 18' thus assumes angular relation with respect to the bolster 18 of the chassis.

It will be obvious that, if desired, the fifth wheel members and the truck bolster 18' might be as readily associated with the rear bolster 19 of the chassis member as with the front bolster 18 thereof to permit of the more convenient operation of the road vehicle of the present invention in either direction.

Secured to each end of the bolsters 18' and 19 and depending therefrom are V-shaped pedestals 28 and in the lower end of each pedestal is mounted a journal box 29 which has vertical sliding movement relative to the pedestal. These lower ends lie preferably within the rims of wheels 30, each wheel preferably including a disk 31 connecting the rim and hub portions at the outer sides thereof. A stub shaft or axle 32 (Fig. 18) extends inwardly from each disk and through the journal box 29, being mounted therein on ball bearings as indicated at 33.

Each pedestal is preferably provided with laterally projecting flanges 34 and each journal box has similar flanges 35, springs or the like 36 being disposed between these flanges whereby the pedestals and the parts carried thereby are resiliently supported upon the wheels to overcome road shocks.

Each front wheel preferably carries a relatively small auxiliary wheel 37 on its inner side for purposes to be hereinafter more fully described. The rear wheels may likewise be equipped with auxiliary wheels to provide for reversal in direction of the vehicle.

It will be noted that there are no through or continuous cross axles on the vehicle so that the space below the body and between the pedestals is free and uninterrupted.

Extending forwardly from the truck bolster 18' is a pair of spaced arms 38 which are provided at their forward extremities with aligned eyes or the like 39. Passing through these eyes is a pivot rod 40 (Fig. 12) on which are mounted the rear extremities of hitch hounds 41 provided with parallel forward portions 42. Between the portions 42 is a clevis block 43 having at each side thereof spaced and perforated lugs or the like 44 through which the portions 42 pass so that the said clevis block may slide longitudinally of the hounds. Between the lugs 44 on each side of clevis block 43 a collar 45 is pinned or otherwise fixed on the respective portion 42 and coil springs 46 surround the said portions between the collar and the lugs thereon.

The clevis block is thus resiliently supported so that it may yield when urged in either direction along the hitch hounds 41. This block is further provided with a centrally disposed coupling pin hole 47 and with a notch 48 at each end. The coupling pin hole is used in the ordinary manner for securing the vehicle to any ordinary tractor or other source of draft energy with all of the vehicle wheels 30 designed to travel upon the ground or roadway. The notches 48 are for purposes to be hereinafter set forth.

Figure 10:
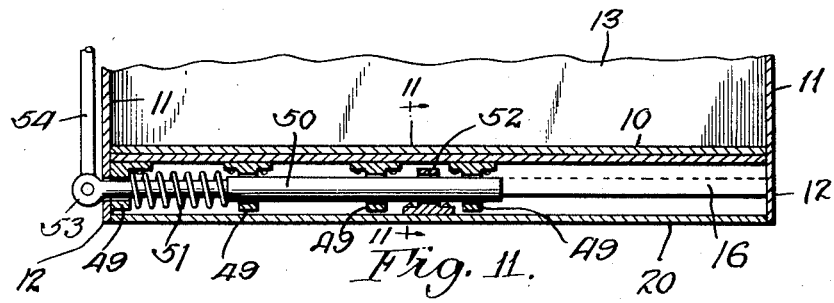
Figure 10 is a similarly enlarged detail sectional view taken on the line 10—10 of Figure 7, illustrating the lower part of the vehicle and the means for attaching the vehicle body to the chassis.

Extending across the body cross frame 16 are guide plates 49 (Fig. 10) through which passes a locking pin 50 normally urged inwardly by a spring 51. A corresponding locking plate 52 is also provided in the channel of the chassis bolster 20 so that the pin 50 may pass therethrough and lock the body against vertical movement on its chassis as more particularly illustrated in Figure 10 of the drawings. An eye 53 is preferably formed on the outer extremity of the pin 50 and forms means for the attachment of any desired form of operating device for the pin, such means being indicated at 54. The eye 53, instead of being positioned as shown, may be placed on the inside of sill 12. Lift eyes 55 are attached to the top of the body and below the body are mounted small wheels or rollers 55', which latter may be swivelled, serving to support the body so that it may be rolled when removed from the chassis and placed on the floor of a storehouse, freight car, or the like.

The special tractor features used herewith may be applied to the chassis of any ordinary truck having a suitable frame, the particular arrangement of the engine, cab, wheels and the like forming no specific part of the present invention. As illustrated in Figures 1 and 2 of the drawings, a tractor conventionally shown at 56 supports, by means of cross arm attachment 56' ahead of the rear tractor wheels, a pair of laterally spaced lifting and supporting rails 57 which are curved downwardly at their rear ends and oppositely curved at their forward ends to form hook-shaped stops 58. The rear ends of these rails lie slightly below the auxiliary lifting wheels 37 so that forward movement of the vehicle relative to the tractor will cause these wheels 37 to ride upon the rails 57 and thus lift the front of the vehicle and again lower it under load weight into the hooked-shaped, socket-stops 58. Obviously this forward movement will cease automatically upon engagement of the wheels 37 with the stops 58 formed upon the forward extremities of the rails 57.

Extending longitudinally of the center of the tractor is an endless link belt or chain 59 traveling over suitable sprockets 60, one of which is adapted to be driven from any suitable power take-off indicated at 61 from a motor or other like means 62, such means being reversible and operable from the cab. This chain carries one or more pairs of spaced oppositely disposed hook lugs 63 (Figures 1 and 16) and these lugs engage in the notches 48 of clevis block 43 so that in use the clevis block is held with freedom for movement or release from place by raising when desired by either lug 63 to move with the chain 59 as the latter is moved in one direction or the other. Thus the front of the vehicle may be drawn forwardly and upwardly upon the tractor to settle to the positions illustrated in Figure 1 of the drawings, or, by reversal of the movement of the chain, may be moved rearwardly to rest with all four wheels on the ground. Obviously other means may be utilized for hauling the front end of my novel vehicle onto a truck or the like.

By the construction described, the vehicle may be attached to and supported upon a tractor and the shocks of starting, stopping and the like, will be cushioned by the springs 46 cooperating with the clevis block 43. Also the body may be lifted, with its contents undisturbed, off the chassis by crane chains C and, if deposited on a car floor, may be secured in position thereon by suitable blocking.

With the vehicle in position, as shown in Figure 4, either at rest or to be lifted from the chassis, any desired means might be provided to maintain the hitch hound in vertical disengaged position, as for example spring clips or the like 60, secured in proper position upon the front wall 13 of the vehicle.

Under conditions of heavy live load pressure it will be seen that the front wheels 30, by reason of being rotatable on spindles 32 provided at opposite ends with the small idler wheels 37 and all held under locked control by the socket stops 58 braced to the tractor frame, are urged downwardly toward the ground and will, under sufficient load pressure, ride upon the ground as illustrated in dotted lines at 30' (Fig. 1) thereby sharing in supporting the load and giving it resiliency through the joint action of the axle springs of both vehicles.

From the foregoing, it will be seen that I have devised an efficient and practical construction for the economical transportation or haulage of freight. Although I have described and illustrated the invention with considerable particularity, it is to be understood that various changes and modifications may be made therein without departing from the spirit and scope thereof as defined in the appended claims.

Brakes and braking mechanism of any usual or suitable type may be used.

What I claim is:

1. In combination, a wheel supported chassis adapted to support a freight container, a power driven vehicle, means on said vehicle for engaging said chassis, means for moving the front end of said chassis forwardly onto and rearwardly off said vehicle, and means for supporting the front end of said chassis on said vehicle with the front wheels of the chassis straddling the vehicle and adapted for road engagement under heavy loads.

2. The combination with a motor vehicle provided with a rearwardly and downwardly extending rail at each side thereof, of a second vehicle provided with supporting wheels including a pair of wheels disposed adjacent the front thereof, each of said front wheels being provided with an auxiliary wheel fixed concentrically thereof, said auxiliary wheels being spaced to roll upon the rails, an endless chain extending longitudinally of the motor vehicle, means to drive said chain in opposite directions selectively, a pair of hitch-hounds hingedly mounted upon the forward part of the second vehicle for swinging movement in a vertical plane, a clevis block slidably mounted between the forward extremities of the hitch-hounds and resiliently supported against longitudinal movement relative to said hounds, and spaced hooks on the endless chain adapted to engage opposite sides of the clevis block.

3. The combination with a wheel supported vehicle chassis, of a wheel pedestal depending therefrom and having an opening at its lower end, a journal box mounted in said opening and adapted for vertical movement therein, a flange extending laterally from each side of said journal box, corresponding flanges on said pedestal and vertically spaced with respect to the flanges of said journal box, springs mounted between the flanges of the journal box and the flanges of the pedestal and bolts connecting said flanges for varying the tension on said springs.

4. The combination with a vehicle chassis, of a wheel pedestal depending therefrom and having an opening at its lower end, a journal box mounted in said opening and adapted for vertical movement therein, a short stub axle mounted for rotation in said journal box and extending from either side of said pedestal, a road wheel fixed to said axle on one side of said pedestal, a flange extending laterally from each side of said journal box, corresponding flanges on said pedestal and vertically spaced with respect to the flanges of said journal box, springs mounted between the flanges of the journal box and the flanges of the pedestal, and a small auxiliary wheel fixed to said axle on the other side of said pedestal.

5. The combination with a wheel supported vehicle chassis having a cross bolster and a vehicle body having a cross bolster corresponding to said front bolster of the chassis, of a pair of dish-shaped fifth wheel members superimposed one upon the other, the upper one of said members having a down-turned rim portion extending over the rim of the lower of said members, said pair of members being disposed centrally of and between said front bolster of the chassis and said front bolster of the vehicle body, aligned openings in said bolsters and in said members, and a king pin extending through said aligned openings.

6. The combination with a motor vehicle provided with a rearwardly and downwardly extending lift rail at each side, of a second vehicle having four supporting wheels arranged with one pair toward the front of the vehicle and the other pair toward the rear thereof, the front wheels each having a small auxiliary wheel positioned concentrically thereof, the auxiliary wheel being spaced to roll on said rails, said front pair of wheels straddling the motor vehicle and lift rails and adapted for road engagement under heavy loads and means on the motor vehicle for engaging the second vehicle to move it forwardly onto and rearwardly off said rails.

7. The combination with a motor vehicle of a rearwardly and downwardly extending lift rail at each side of said vehicle, the forward end of said lift rails being curved upwardly and rearwardly to form a substantially U-shaped pocket, a second vehicle adapted to be carried by said first mentioned vehicle, said second vehicle being provided with lift rail engaging means to fit into said pocket, said pocket preventing upward or downward displacement of said lift rail engaging means relative to said first mentioned motor vehicle.

8. The combination of a motor vehicle having at each side a rearwardly and downwardly extending lift rail, the forward end of each of said lift rails being curved upwardly and rearwardly to form a U-shaped pocket and a second vehicle having means adapted to engage and seat in the pocket of said lift rails, upward and downward displacement of said second vehicle relative to said first mentioned motor vehicle being thereby prevented.

9. In combination, a motor vehicle having a rearwardly and downwardly extending lift rail positioned on each side thereof, the forward portion of said lift rail being curved upwardly and rearwardly to form a U-shaped pocket, of a second vehicle, the forward portion of which is adapted to be carried by said first mentioned motor vehicle, the front wheels of the second vehicle each having lift rail engaging means comprising a small auxiliary wheel positioned concentrically of each of said front wheels, said auxiliary wheels being spaced to roll on said rails and adapted to seat within the U-shaped pocket of said rails when the forward portion of the second vehicle is positioned on the first mentioned motor vehicle, said U-shaped pockets substantially enclosing said auxiliary wheels and preventing upward and downward displacement thereof.

JOSEPH C. BONNER.